United States Patent [19]

Ito et al.

[11] Patent Number: 4,912,504

[45] Date of Patent: Mar. 27, 1990

[54] COPYING APPARATUS CAPABLE OF DIVISIONAL COPY

[75] Inventors: Masazumi Ito, Toyohashi; Tomoji Murata, Toyokawa, both of Japan

[73] Assignee: Minolta Camera Kabushiki Kaisha, Osaka, Japan

[21] Appl. No.: 273,720

[22] Filed: Nov. 17, 1988

Related U.S. Application Data

[63] Continuation of Ser. No. 101,484, Sep. 28, 1987, abandoned.

[30] Foreign Application Priority Data

Sep. 29, 1986 [JP] Japan ................................ 61-231018
Sep. 29, 1986 [JP] Japan ................................ 61-231019

[51] Int. Cl.[4] ................................................ G03B 27/52
[52] U.S. Cl. ........................................ 355/61; 355/25; 355/46; 355/60
[58] Field of Search ...................... 355/51, 61, 25, 46, 355/60

[56] References Cited

U.S. PATENT DOCUMENTS

| | | | |
|---|---|---|---|
| 4,017,173 | 4/1977 | Komori et al. . | |
| 4,618,244 | 10/1986 | Watanabe . | |
| 4,655,585 | 4/1987 | Watanabe | 355/61 |
| 4,659,207 | 4/1987 | Maekawa | 355/25 |
| 4,668,079 | 5/1987 | Ibuchi . | |
| 4,688,930 | 8/1987 | Ohno | 355/25 |
| 4,690,543 | 9/1987 | Watanabe . | |

FOREIGN PATENT DOCUMENTS

| | | | |
|---|---|---|---|
| 146255 | 1/1985 | Japan | 355/25 |

*Primary Examiner*—Monroe H. Hayes
*Attorney, Agent, or Firm*—Burns, Doane, Swecker & Mathis

[57] ABSTRACT

A copying apparatus capable of divisional copy mode for sheets in which two sheet documents are respectively positioned along two reference edges on a document platen and copy operations for each of documents are conducted on the basis of each of reference edges in response to one copy start instruction.

4 Claims, 11 Drawing Sheets

COPYING APPARATUS CAPABLE OF DIVISIONAL COPY

This is a continuation of application Ser. No. 101,484 filed Sept. 28, 1987 now abandoned.

FIELD OF THE INVENTION

The present invention relates to a copying machine capable of divisional copy.

BACKGROUND OF THE INVENTION

Heretofore, copying machines have been provided which have the capability of making divisional copies of an original document such as a book. A divisional copy of a book is made by placing the two opposing pages of an open-faced book on the original document platen and having copying operations performed consecutively on the image fields of both pages by starting said copying operation only once. The images corresponding to both the respective image fields are formed either on two sheets of copy paper or on the obverse and reverse sides of a single sheet of copy paper. This type of book divisional copying function entails positioning the page to be copied on the document platen and includes closing the document cover, but is convenient in that it eliminates half the conventional process.

Consider the application of this type of divisional copy function to a sheet document. When using a copying machine having a conventional book divisional copying function, a two-sheet document is arranged with the sheets side by side on the document platen. In such an instance, one sheet of the document may be aligned along the reference edge of the document platen, but the remaining sheet of the document must be aligned with the opposite edge of the first aligned sheet of the document. Aligning the sheet document in a side-by-side manner is troublesome when the size of the sheet original does not conform to the size of the copy paper, and particularly if the sheet original is very thin.

SUMMARY OF THE INVENTION

Accordingly, a main object of the present invention is to provide a copying machine having an improved divisional copying function for sheet documents.

A further object of the present invention is to provide a copying machine having two reference edges for divisional copying of two-sheet documents.

These and other objects are accomplished by a copying machine which controls the copying operation when the sheet divisional copy mode is specified so that said copy operation is based on two reference edges, said two reference edges being provided on the document platen and having a two-sheet original aligned thereon.

More precisely, the two reference edges are located at opposite ends of the document platen scanning direction. The second sheet of the document is positioned at the reference edge on the downstream side of the scanning direction, but since scanning is conducted from the upstream side, the image formation starting position for the second sheet is determined by means of an operation involving the specified magnification and copy paper size.

Still more precisely, the two reference edges are the edge of the document platen on the upstream side in the scanning direction and a cursor designated position indicating the line of bisection of the length of the scanning distance on the platen.

BRIEF DESCRIPTION OF THE DRAWINGS

These and other objects or features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Embodiments of the present invention are explained hereinafter with reference to the accompanying drawings.

(1) Explanation Of The Copying Machine

Figure 1:
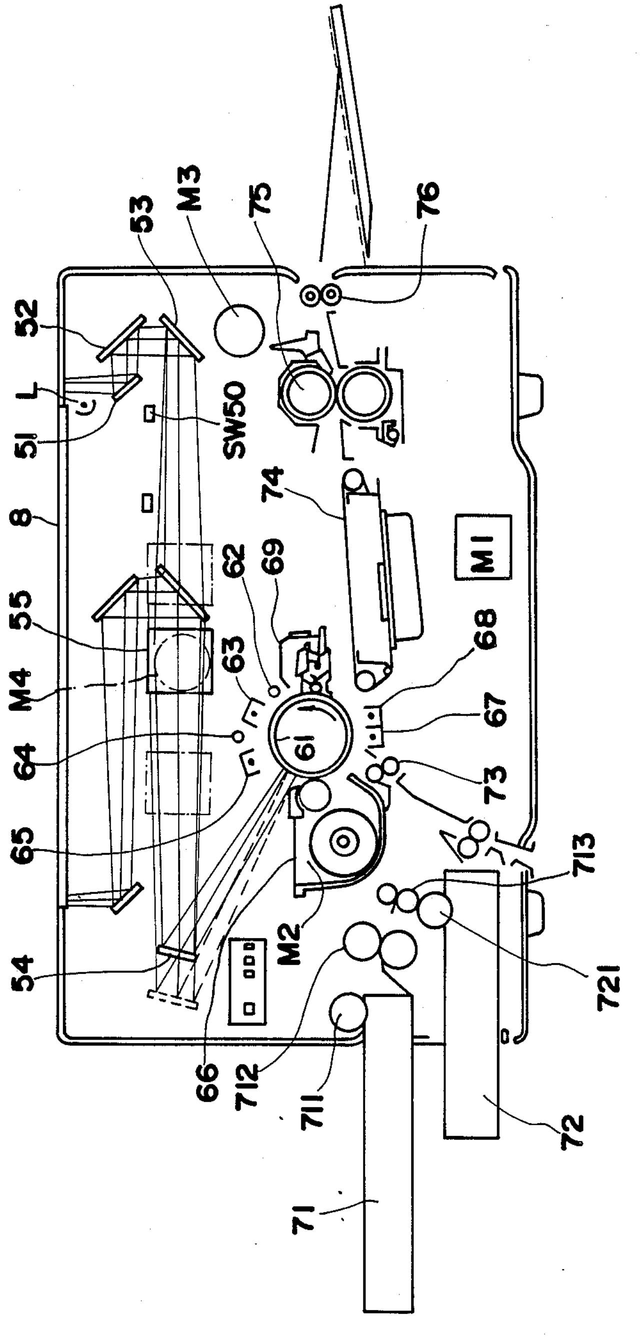
FIG. 1 is a model drawing showing the construction of a copying machine related to the first embodiment of the present invention.

FIG. 1 is a model diagram showing the construction of a copying machine related to the present invention.

As shown in the drawing, the copying machine comprises an optical system 5 (51 to 55) for scanning the document and transmitting an optical image, image forming portion 6 (61 to 69) for conducting the copying operation whereby an optical image is reproduced on copy paper, paper transporting portion 7 (71 to 76) for transporting and feeding the copy paper, and a glass document platen 8 for the placement of the original document.

Optical system 5 comprises a scanning portion and magnification setting portion. The scanning portion comprises a first scanner, not shown in the drawing, which incorporates a light source L and mirror 51, and a second scanner which incorporates mirrors 52 and 53 and which is also not shown in the drawing. The magnification setting portion comprises a mirror 54 and lens 55. The aforesaid scanning portion reciprocates along the underside of the document platen 8 and scans during outward travel via light exposure on the original document provided on the platen. At this time, the photic image from the original document which is illuminated by light source L is reflected by mirrors 51, 52 and 53, then is transmitted through lens 55 (magnification lens block), and finally is reflected by mirror 54 to a photosensitive drum 61 where the image is projected onto said drum 61. The aforesaid first and second scanner portions are linked and driven by means of the same scanning motor M3. The speeds of the first and second scanning portions are V/N and V/2N (V: the peripheral speed of the drum, N: copy magnification), respectively, to maintain a constant optical path length. The aforesaid motor M3 is provided with an output shaft having a pulse generator attached thereto; the output pulse is used for speed control. On the other hand, mirror 54 and lens 55 which form the magnification setting portion are linked and driven by means of a separate stepping motor M4, e.g., lens 55 travels on the optical axis which varies with the copy magnification, and mirror 54 oscillates as it travel to correct the optical path and image formation point.

Image forming portion 6 comprises a photosensitive drum 61 which is rotatable in the direction indicated by the arrow; disposed circumferentially around said drum 61 are suberaser lamp 62, sub-charger 63, main-eraser lamp 64, main charger 65, developing unit 66, transfer charger 67, copy paper separation charger 68, and a blade-type cleaning device 69. The surface of drum 61 has a photosensitive layer provided thereon, said photosensitive layer being charged with increased sensitization by passing the aforesaid eraser lamps 62 and 64 and sensitizing chargers 63 and 65, and having an electrostatic image formed thereon via exposure to light from the aforesaid optical system 5 received through a slit portion. This electrostatic image is developed by means of developing unit 66 and the toner image is transferred onto the copy paper (fed by paper transporting portion 7) by means of the transfer charger 67.

Paper transporting portion 7 comprises paper cassettes 71 and 72 and their respective paper transport roller sets 711 and 721 and feed roller sets 712 and 713, timing roller set 73, feed belt 74, fixing unit 75, and discharge roller set 76, said elements being driven by means of main motor M1.

(2) Explanation Of The Operation Panel

Figure 2:
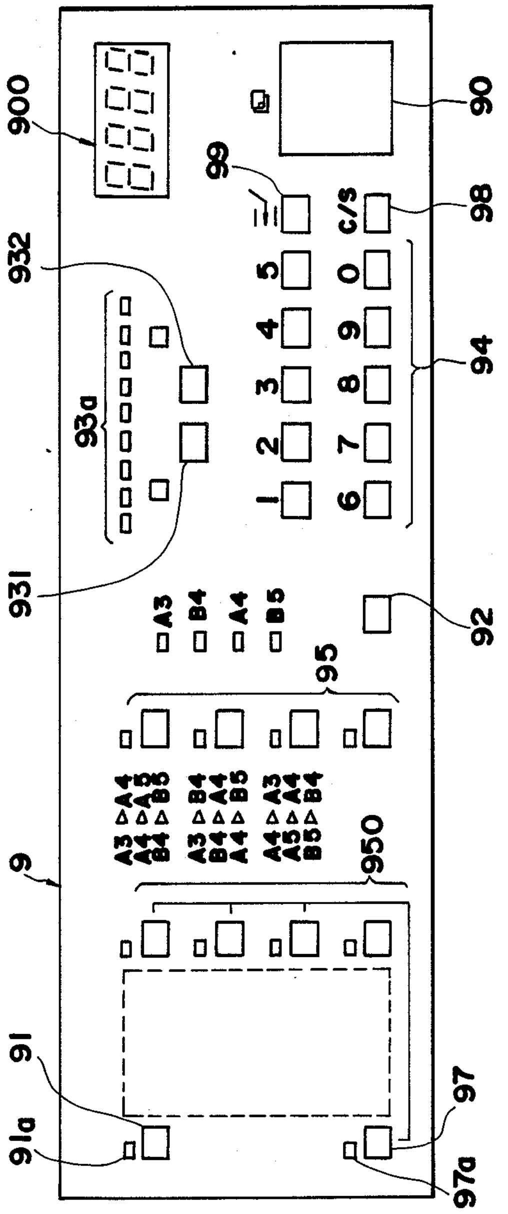
FIG. 2 is a plan view of scanner panel 9 of the aforesaid copying machine.

FIG. 2 is a plan view showing the operation panel 9 of the aforesaid copying machine.

Operation panel 9 has provided thereon, as shown in the drawing, print key 90 for starting the copy operation, divisional copy key 91 for selecting the divisional copy mode related to the present invention, copy paper selection key 92 for selecting according to size the copy paper stored in paper cassettes 71 and 72, image density increase and decrease keys 932 and 931, ten key set 94 (corresponding to numeric values 1, 2, . . . 9, 0) for entering numeric values for the copy number and magnification, magnification setting key set 95 for invoking a preset copy magnification, magnification setting key set 950 for writing to and reading from memory optional copy magnifications, switching key 97 for switching to the optional magnification mode and invoking the reading of magnifications set by said key set 950, clear/stop key 98, interrupt key 99, and display panel 900 for the segmental display of numeric values for the copy number and magnification. The small squares in the drawing, for example the items labeled 91*a* and 97*a*, are light-emitting diodes (LEDs) for indicating the operating status of the adjacent keys. Additionally, the ON/OFF condition of LED 91 (more precisely, the conditional flag indicating the ON/OFF status) adjacent to the divisional copy mode key 91 is also used as a means for indicating to a control portion as to whether or not the divisional copy mode has been specified.

(3) Explanation Of The Control Portion

Figure 3:
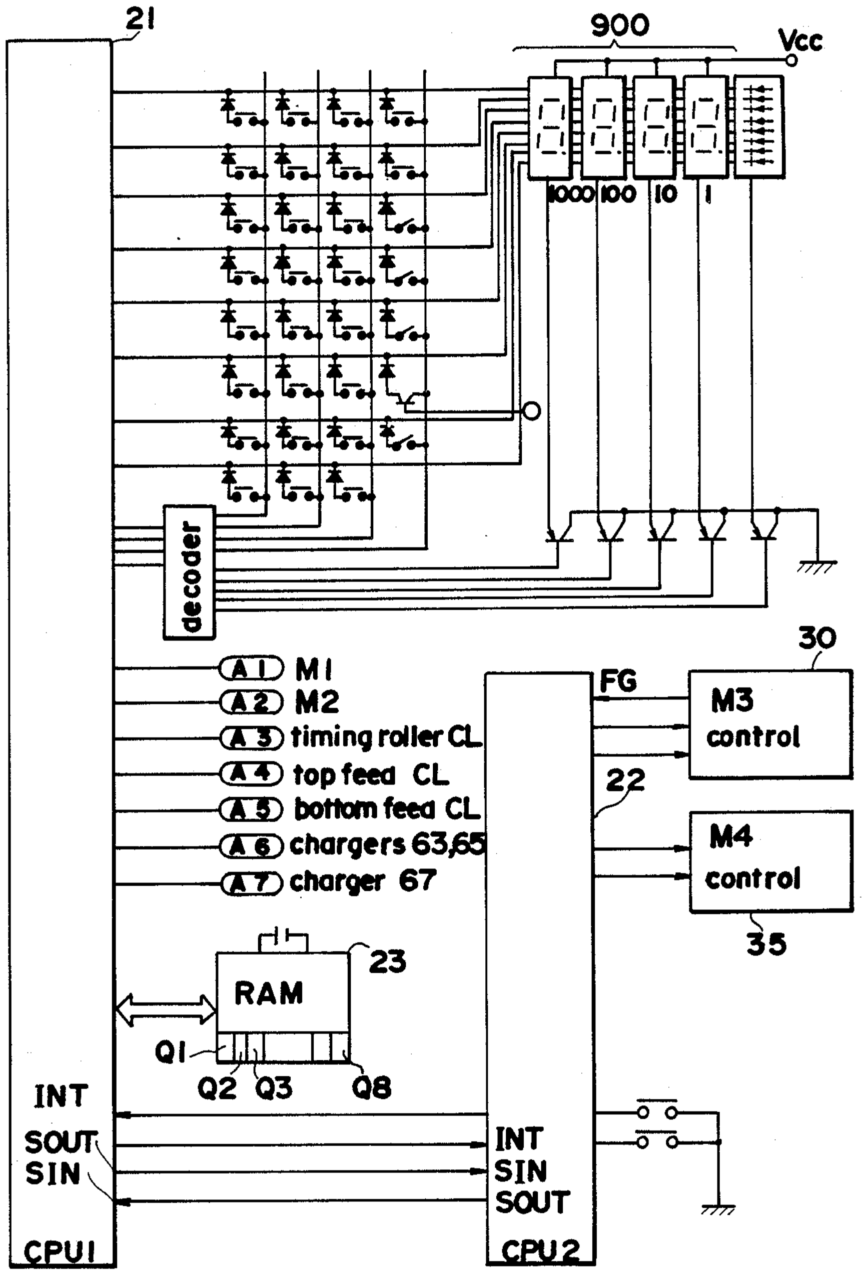
FIG. 3 is an explanatory diagram of the control portion of the copying machine.

FIG. 3 is an explanatory digram showing the control portion of the aforesaid copying machine.

The control portion in the drawing comprises a first central processing unit (hereinafter CPU) 21, second CPU 22, and Random Access Memory (hereinafter RAM) 23.

The first CPU 21 controls the actuation of the previously mentioned image forming portion 6 and paper transporting portion 7 (said actuations being implemented by means of motors M2 and M1, respectively), numeric display of the previously mentioned display panel 900, and other main operations of the copying machine such as temperature regulators and the like.

The second CPU 22 controls actuation of scanning motor M3 and stepping motor 44 (copy magnification setting motor) according to instructions from the aforesaid first CPU 21.

The RAM 23 is provided to write and read copy operation data, magnification setting data, and various other data (data are input from sensor feedback indicating the operation status of the various operation keys and devices and the CPU Read Only Memory (hereinafter ROM).

In the drawing, item 30 is the actuation circuit for the scanning motor M3, item 35 is the actuation circuit for the stepping motor M4, and the output terminals A1 through A7 of the first CPU 21 are connected to the bases of the various actuation switching transistors for main motor M1, developing motor M2, clutch of timing roller 73, clutch of feed roller 711, clutch of feed roller 721, sensitizing charger 65, and transfer charger 67, respectively.

(4) Explanation Of Operation

Figure 4:
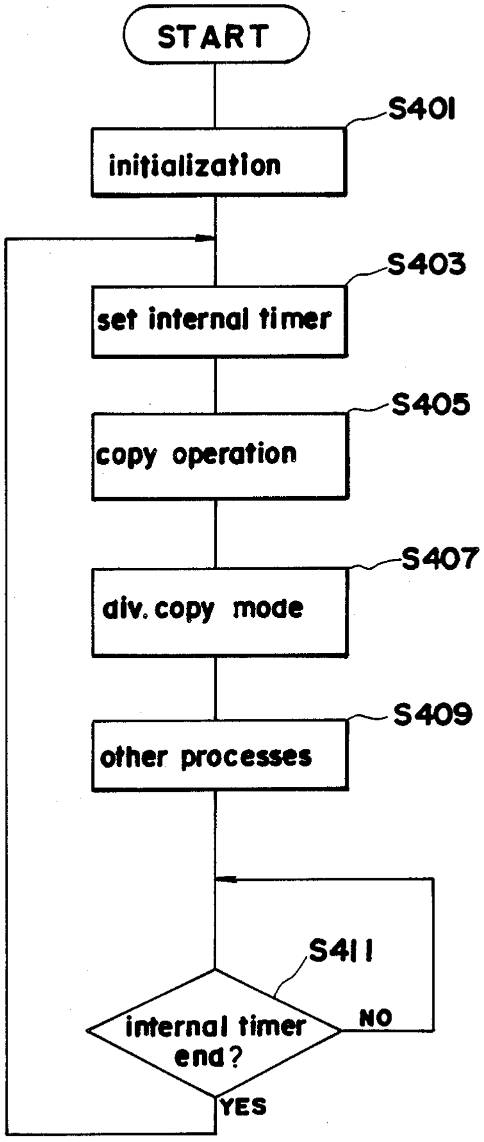
FIG. 4 is a flow chart showing the main routine of the first CPU 21.

FIG. 4 is a flow chart showing a summary of the processing done by the first CPU 21.

When the power source is switched ON, the processing in CPU 21 is started as the initialization status s set (step S401), e.g., as each flag is set at initialization status, the various modes of the copying machine are set at the reference modes (for example, magnification of 1.0, copy number 1, copy paper size B4, and the like).

Subsequently, the internal timer is set (S403) and the copy operation process routine (details of said processing follow hereinafter) is executed (S405).

Next, the divisional copy mode key process routine is executed (S407).

Thereafter, input/output control of various data and command signals (data are input from the operation panel keys, feedback sensors monitoring the operational status of the various devices, second CPU 22 and RAM 23), segmented numeric displays and temperature regulators and the like are executed (S409).

Following the aforesaid processing, completion of the internal timer is awaited (S411) and the routine returns to step S403 from whence the loop is repeated.

Figure 5A:
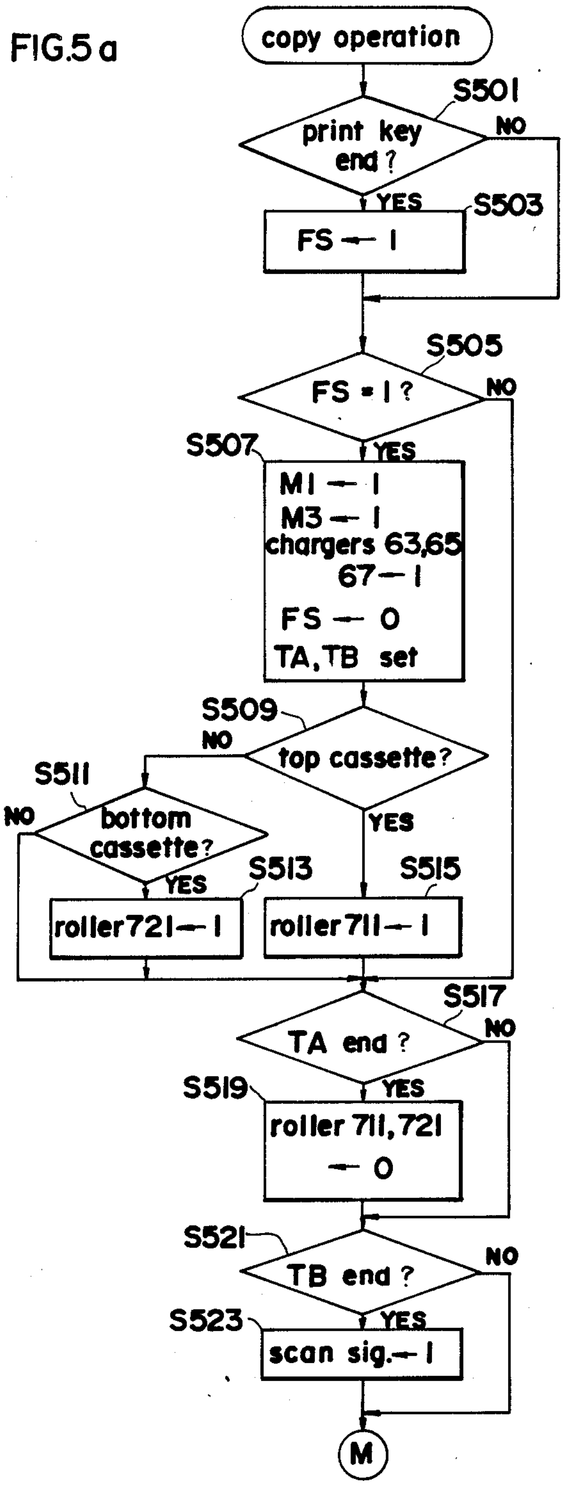
FIG. 5*a* and 5*b* are a flow chart showing details of the copy operation process routine.
Figure 5B:
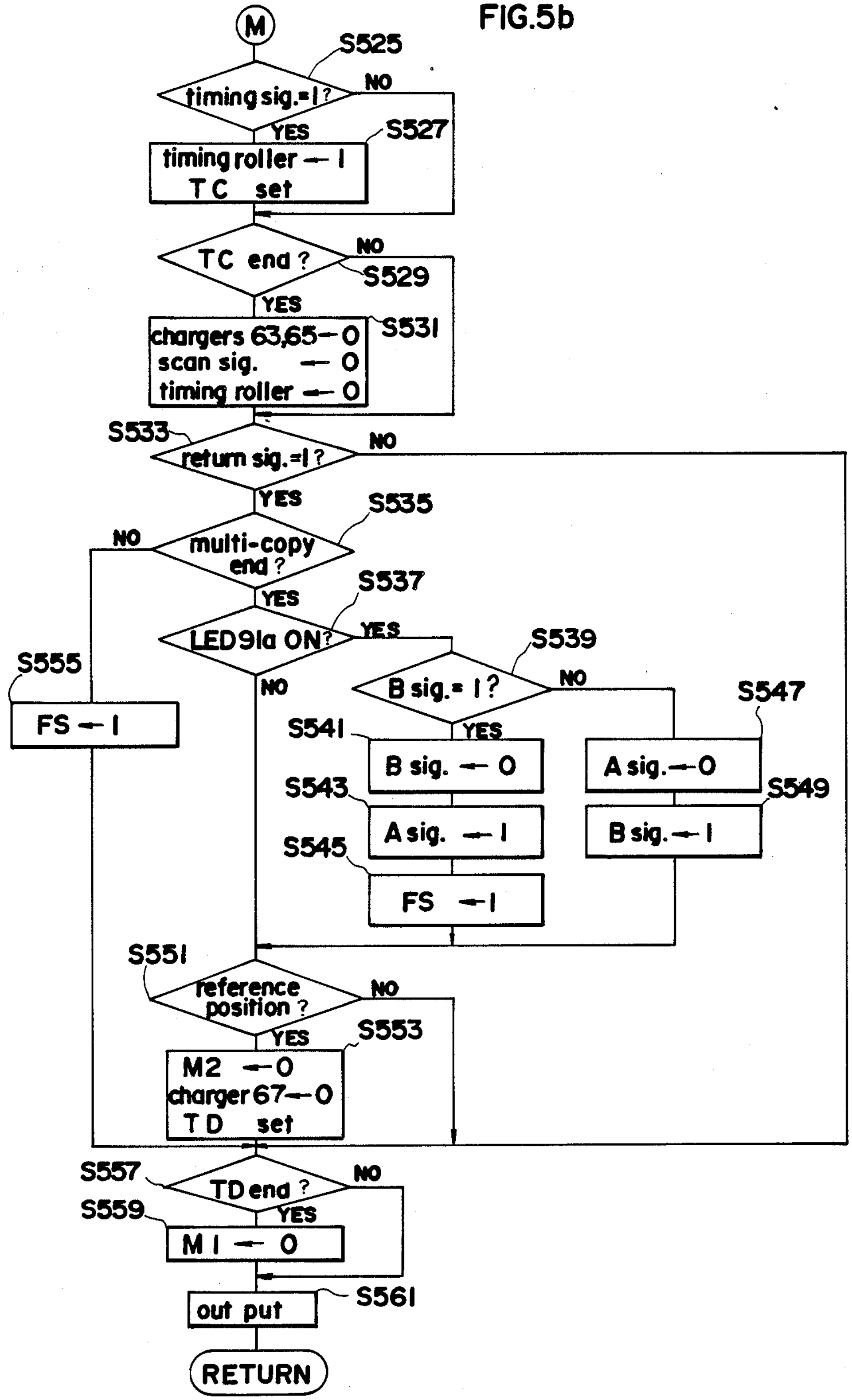

FIG. 5 is a flow chart showing details of the aforesaid copy operation process routine (S405).

In steps S501 and S503, the copy start flag FS is set at "1" (S503) via the detection of input from print key 90 (S501), said flag FS being checked in S505. When the flag FS is set at "1," the main motor M1, developing motor M2, chargers 63 and 65 and transfer charger 67 are each switched to ON status, and timers TA and TB are set. The aforesaid copy start flag FS is also lowered (S507). Thereupon, timer TA specifies the time that the clutch for paper roller 711 or 721 is ON, while timer TB specifies the scan starting time.

In steps S509 to S515, the clutch for either paper roller 711 or 721 is switched ON depending on whether the top cassette 71 or bottom cassette 72 is selected, and transport of the copy paper begins.

Continuing to step S517, the completion of the aforesaid timer TA is checked. When the timer TA reaches completion, the switched-ON paper clutch of roller 711 and 721 is switched OFF (S519) and the transporting of copy paper is terminated.

Then, in step S521, the completion of the aforesaid timer TB is checked. When timer TB reaches completion, the scan starting signal (scan signal) output to the second CPU 22 is set at "1" (S523). The second CPU 22 receives said signals and the scanning process is subsequently started.

Continuing to step S525, the timing signal output from the second CPU 222 is checked.

When the aforesaid timing signal is '37 1," the clutch of timing roller 73 is switched ON and the photosensitive drum 61 and transfer charger 67 have the copy paper fed therebetween, whereupon the image transfer to said copy paper is started. In addition, the timer TC is set (S527). The timer TC sets the scan completion time, charging completion time, and the time at which the timing roller clutch is switched OFF (S529 and S531). The set time of said timer is determined by means of the copy paper size and set copy magnification which is selected in steps S509 to S511.

Subsequently, in step S533, a check is made to determine whether or not the return signal output from the second CPU 22 is "1." If the return signal is "1," determinations are made as to whether or not the multi-copy is completed (S535) and whether or not the divisional copy mode is specified (S537). When the divisional copy mode is specified, a check is made to determine whether or not the B-field signal is "1" (S539). In the divisional copy mode the B-field copy is the first copy and the A-field copy is the second copy.

When the B-field copy signal is "1" (S539), the B-field copy signal is re-set to "0" and the A-field copy signal is set at "1," the copy start flag is raised, and the A-field copy which is the second copy is prepared (S545). In addition, when the B-field copy signal is not set at "1" (S539), the A-field copy signal is "1" and is therefore re-set to "0" (S547), and the B-field copy signal is set at "1" (S549). Also, the A-field and B-field copy signals are output to the second CPU 22.

Next, when the scanning portion returns to the reference position and a position signal is generated from the second CPU 22 (S551), the developing motor M2 and transfer charger 67 are switched OFF and the timer TD is set (S553). The timer TD specifies the OFF time for the main motor M1 (S557 and S559).

When the multi-copy is not completed in step S736, the copy start flag is raised (S555) and the copy operation is executed again.

In step S561, each of the aforesaid control signals are output to control the external devices and signals are transmitted to the other CPU.

The copy operation is executed in this manner.

Figure 6:
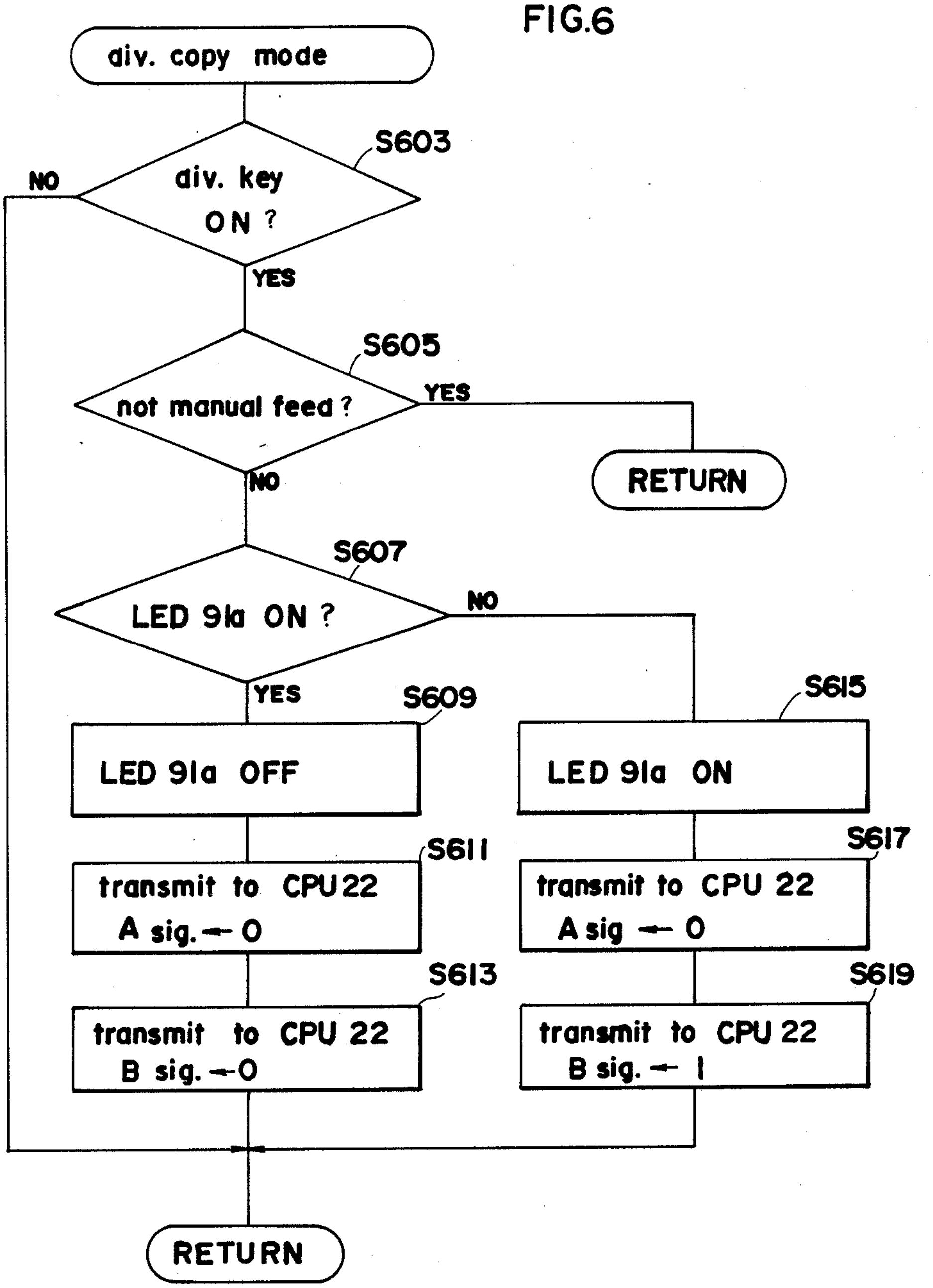
FIG. 6 shows details of the divisional copy key processing routine.

FIG. 6 is a flow chart showing details of the divisional copy processing routine executed in the previously mentioned step S408.

When the divisional copy key 91 is switched ON (S603), the non-manual feed mode is confirmed (S605), then a check is made to determine whether or not the LED 91*a* which indicates the divisional copy mode is illuminated. The LED 91*a* is the means for determining whether or not the divisional copy mode is specified as described previously in step S537 of the copy operation processing routine. When the divisional copy mode indicator LED 91*a* is ON, indicating that the divisional copy mode was previously specified, said LED is switched OFF and the divisional copy mode is cancelled (S609), whereupon both the A-field and B-field copy signal which must be output to the second CPU 22 are set at "0" (S611 and S613). On the other hand, when the divisional copy indicator LED 91*a* is not illuminated (S605), said LED is switched ON and the divisional copy mode is specified (S615), whereupon the A-field copy signal is set at "0" and the B-field copy signal is set at "1" (S619). The B-field copy signal which is set at "1" is checked in step S539 of FIG. 5(*b*).

Figure 7A:
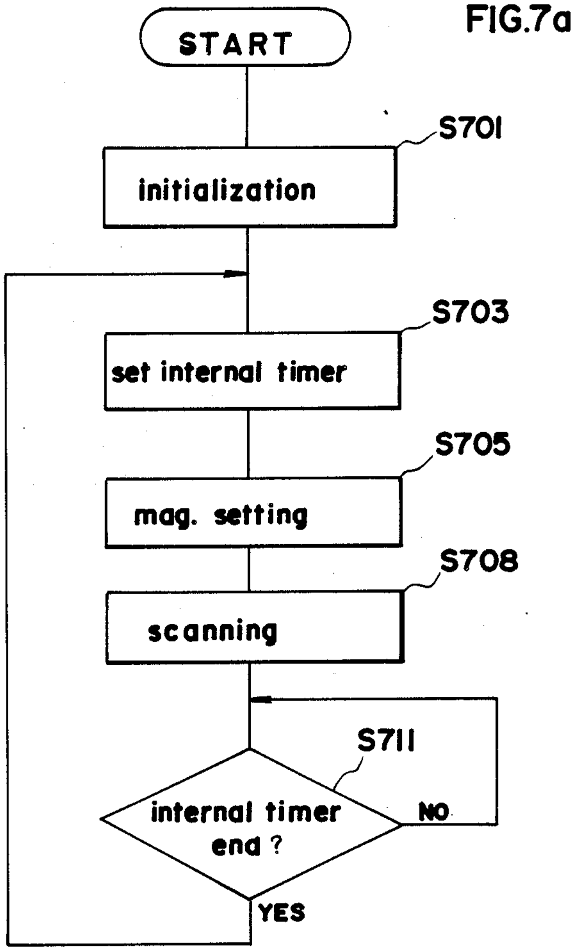
FIG. 7*a* and 7*b* are a flow chart showing the main routine for the second CPU 22.
Figure 7B:
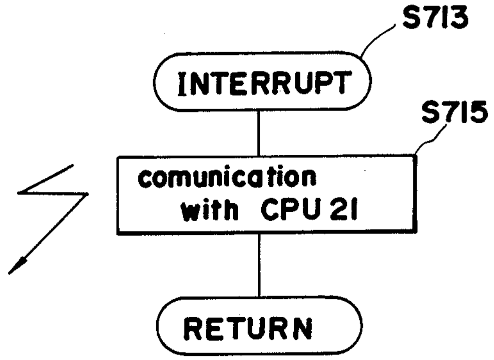

FIG. 7 is a flow chart showing a summary of the processing in the second CPU 22. As shown in FIG. 7(*a*), the second CPU 22 is initialized when the processing starts by means of switching the power source ON (S701). Subsequently, the internal timer is started (S703), the copy magnification processing routine (S705) and the scanning process routine for the copy operation (S708) are executed, the completion of the internal timer is awaited after which the program returns to step S703, at which point the loop is repeated.

When there is an interruption from the first CPU 21 (S713) communications are executed with said first CPU 21 (S715), as shown in FIG. 7(*b*), e.g., the magnification setting routine and scanning routine are executed with instructions received from the first CPU 21.

Figure 8:
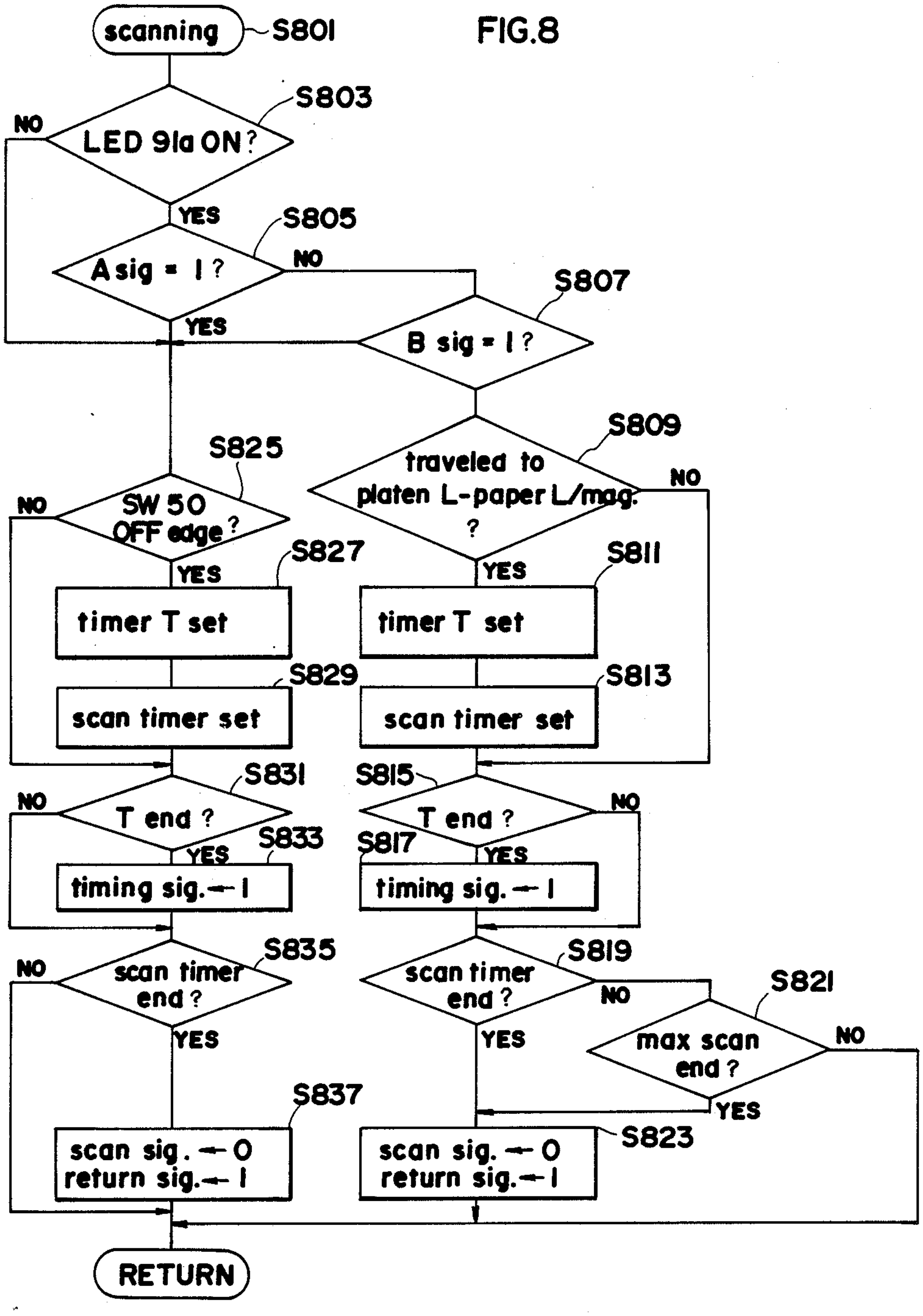
FIG. 8 is a flow chart showing the scanning process routine for the second CPU 22.

FIG. 8 is a flow chart showing details of the scanning process routine (S708) for the second CPU 22.

The scanning process routine mainly controls the operation of the scanning portion.

First, a check is made to determine whether or not the divisional copy mode indicator LED 91*a* is ON (S803). When said LED 91*a* is illuminated, e.g., when the divisional copy mode is specified, a check is made to determine whether or not the A-field copy signal output from the first CPU 21 is "1" (S805) and if said signal value is not "1," a check is made to determine whether or not the B-field copy signal is "1" (S807). When the B-field copy signal is "1," the first scanner departs from the reference position, and a determination is made as to whether or not scanning (travel) has occurred in the paper-feed direction to the position defined as: {(glass document platen length)—(copy paper length/magnification)} (S809). When the first scanner has completed the move to said position, the scanning of the B-field is started and the timer T is set (S811) with reference to the scanning speed. The timer T measures the copy paper feed timing and the timing signal is set at "1" when said timer reaches completion (S815 and S817). In addition, the scan length timer is also simultaneously set (S813) with consideration given to the magnification and paper length in the paper feed direction. At the completion of the scan length timer (S819) or when the first scanner scans the length of the glass document platen in the paper feed direction (S821), the scanning signal is set at "0" and the return signal is set at "1" (S823), whereupon the first scanner returns to the reference position.

Next, when the A-field copy signal is "1," the timer T and scan timer are set (S827 and S829) in the same manner as described above via the ON-edge status of position switch SW50 (S825). Position switch SW50 feeds back data as to whether or not the scanning portion is at the scanning start reference position.

Figure 9:
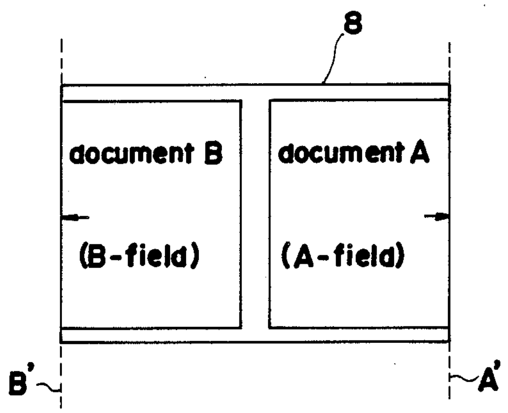
FIG. 9 is an explanatory diagram showing the original document positioning in the first embodiment.

Furthermore, referring to FIG. 9 to explain the movement of the aforesaid scanning portion, the scanning portion first travels a segment {(glass document platen length)—copy paper length/magnification)} in the direction of paper transport and corresponding to the B-field copy signal, and scans the region (B-field) in accordance with copy paper size and the like, with reference to the single edge B' of the glass document platen. Next, the scanner returns to the reference position, and the next region (A-field) is scanned corresponding to the A-field copy signal and in accordance with the copy paper length and tee like, with reference to the other edge A' of the glass document platen.

Timing signals are output simultaneously with the scanning process as per the aforesaid explanation, and the copy images corresponding t the A- and B-fields are each formed on separate sheets of copy paper. Thus, if document B and document A are each positioned with reference to the two edges in a copying machine related to the described embodiment, as shown in FIG. 9, copies can be readily made without any position slippage.

(5) Second Embodiment

Figure 11:
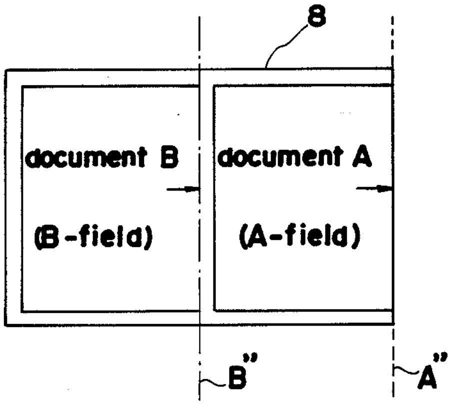
FIG. 11 is an explanatory diagram showing the original document position in the second embodiment.
Figure 10:
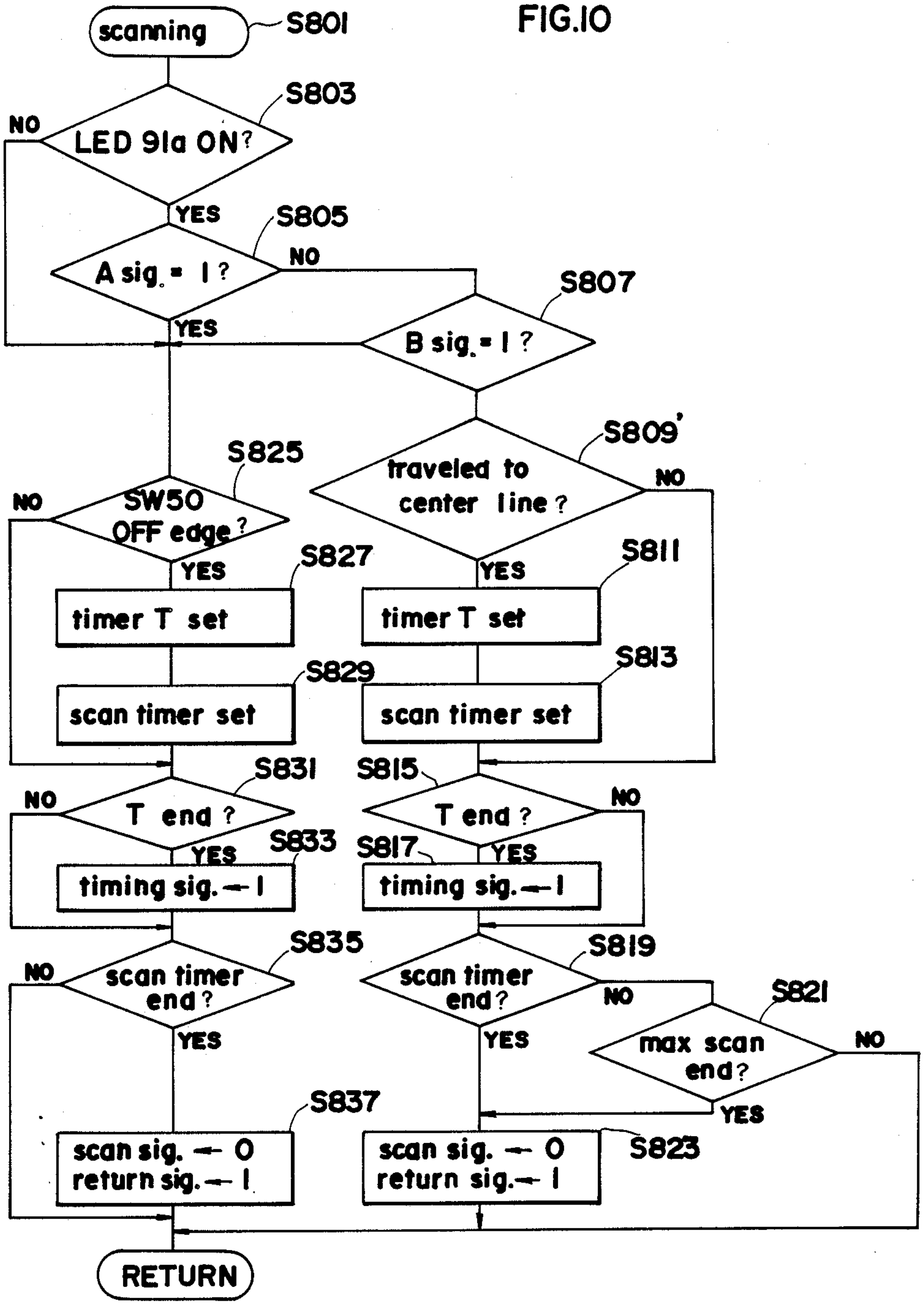
FIG. 10 is a flow chart showing the scanning process routine for the second CPU 22 in the second embodiment.

The second embodiment of the present invention is herein explained only in those aspects which differ with the first embodiment and with reference to FIGS. 10 and 11, because only the scanning process described in FIG. 10 (at step 809') differs from the first embodiment described in FIG. 8.

First, with reference to FIG. 11, the reference edges for document placement are edge A" which is the edge on the upstream side of the document platen scanning direction and the center line B" which is the position one-half the length of the document platen. Center line B" provides a movable cursor on the underside of the glass document platen, said cursor having a line affixed thereto which is movable to the center position only during the divisional copy mode. Additionally, a line may be provided on the glass document platen which is a color to which the photosensitive member is insensitive.

The following is an explanation of the movement of the scanning portion using FIG. 11. The scanning portion first travels one-half the length of the glass document platen (to the center line) in the direction of paper feed and in accordance with the B-field copy signal, and scans the region (B-field) according to the copy paper size and the like and with reference to the center line B". Subsequently, the scanning portion returns to the reference position then scans the region (A-field) in accordance with the A-field copy signal and the copy paper size and the like and with reference to the edge A" which is the first scanner reference position on the glass document platen.

The control of this operation is explained hereinafter with reference to the flow chart shown in FIG. 10.

FIG. 10 is a flow chart showing details of the scanning process routine for the second CPU 22 described in FIG. 7 (S708).

Control of the scanning portion movement is mainly controlled in the scanning process routine.

First, a check is made to determine whether or not the divisional copy mode indicator LED **91*a* is illuminated (S803). When said LED 91*a* is ON, e.g., when the divisional copy mode is specified, a check is made to determine whether or not the A-field copy signal output from the first CPU 21 is '37 1" (S805), and if said signal is not "1," a check is made to determine whether or not the B-field copy signal is "1" (S807). When the B-field copy signal is "1," the first scanner departs from the reference position in the direction of paper feed, and a check is made to see whether or not said first scanner has travelled to the position one-half (center line) the length of the glass document platen (S809). When the first scanner completes the move to said position, B-field scanning starts and timer T is set with consideration given to the scanner speed (S811). Timer T measures the copy paper feed timing and when said timer reaches completion the timing signal is set at "1" (S815 and S817). In addition, the scan length timer is also simultaneously set with consideration given to the magnification and paper length in the paper feed direction (S813). At the completion of said scan length timer (S819) or when the first scanner scans the length of the glass document platen in the paper feed direction (S821), the scan signal is set at "0" and the return signal is set at "1" (S823**), and the scanner returns to the reference position.

Then, when the A-field copy signal is "1," timer T and the scan timer are set (S827 and S829) in the same manner as described above by means of the ON-edge status of position switch SW50 (S825).

The copying machine having a divisional copy function for sheet documents as explained above provides ready positioning of original documents and increases the servicability of the divisional copy function.

Furthermore, although only the divisional copy function for sheet documents has been explained in the above embodiments, the copying machine is so constructed as to also allow the use of the divisional copy function for books.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A copying apparatus capable of operating in a divisional copy mode for sheets in which two sheet documents are successively scanned in response to one copy instruction, the apparatus comprising:

a document platen supporting documents thereon;

two reference edges provided at opposite ends of the document platen with respect to the scanning direction, wherein edges of two sheet documents are brought into contact with said reference edges respectively so that two sheet documents are specifically positioned;

a scanner being reciprocally movable under the document platen to scan the documents placed on the document platen, the scanner being initially positioned at a home position defined at a upstream position from the reference edge on the upstream side in the scanning direction; and means, responsive to the copy instruction under the divisional copy mode for sheets, for controlling the scanner such that the scanner travels from the home position to scan one of the sheet documents and subsequently and automatically travels to scan another of the sheet documents after having returned to the home position.

2. A copying apparatus as claimed in claim 1, wherein an image formation starting position for the sheet document positioned at the reference edge on the downstream side of the scanning direction is determined according to a specified magnification and size of copy paper used for the divisional copy mode for sheets.

3. A copying apparatus capable of operating in a divisional copy mode for sheets in which two sheet documents are successively scanned in response to one copy instruction, the apparatus comprising:

a document platen supporting documents thereon;

a first reference edge provided at one end of the document platen on the upstream side in the scanning direction;

a second reference edge of a center line which divides the length of the document platen into two in the scanning direction, wherein edges of two sheet documents are brought into contact with said first and second reference edges respectively so that two sheet documents are positioned at specific locations respectively;

a scanner being reciprocally movable under the document platen, the scanner being initially positioned at a home position defined at a slightly upstream position from the first reference edge in the scanning direction; and means, responsive to the copy instruction under the divisional copy mode for sheets, for controlling the scanner such that the scanner travels from the home position to scan one of the sheet documents and subsequently and automatically travels to scan another of the sheet documents after having returned to the home position.

4. A copying apparatus as claimed in claim 3, wherein an image formation starting position for the sheet document positioned at the second reference edge is in alignment with the second reference edge.

* * * * *